Patented Mar. 22, 1927.

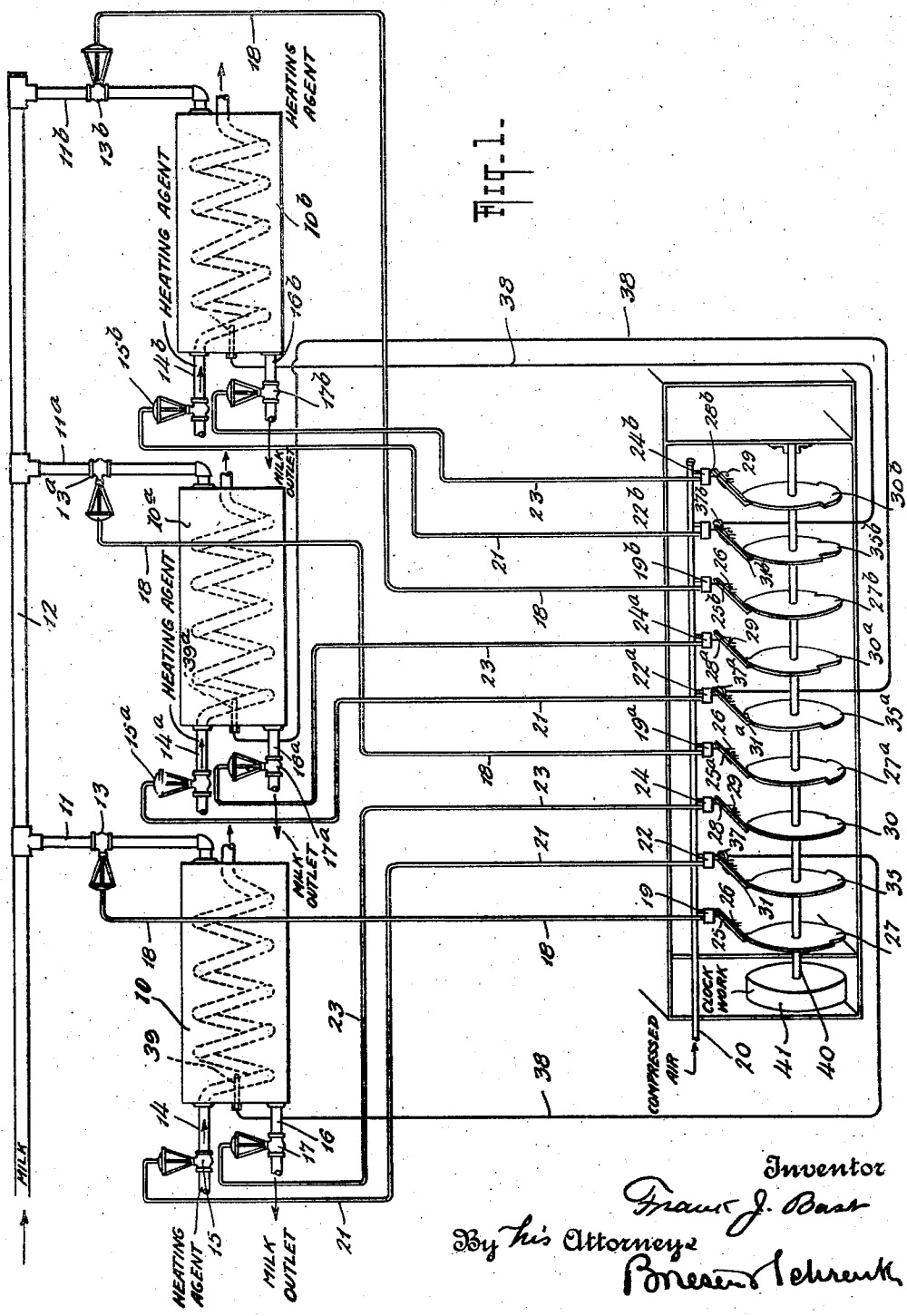

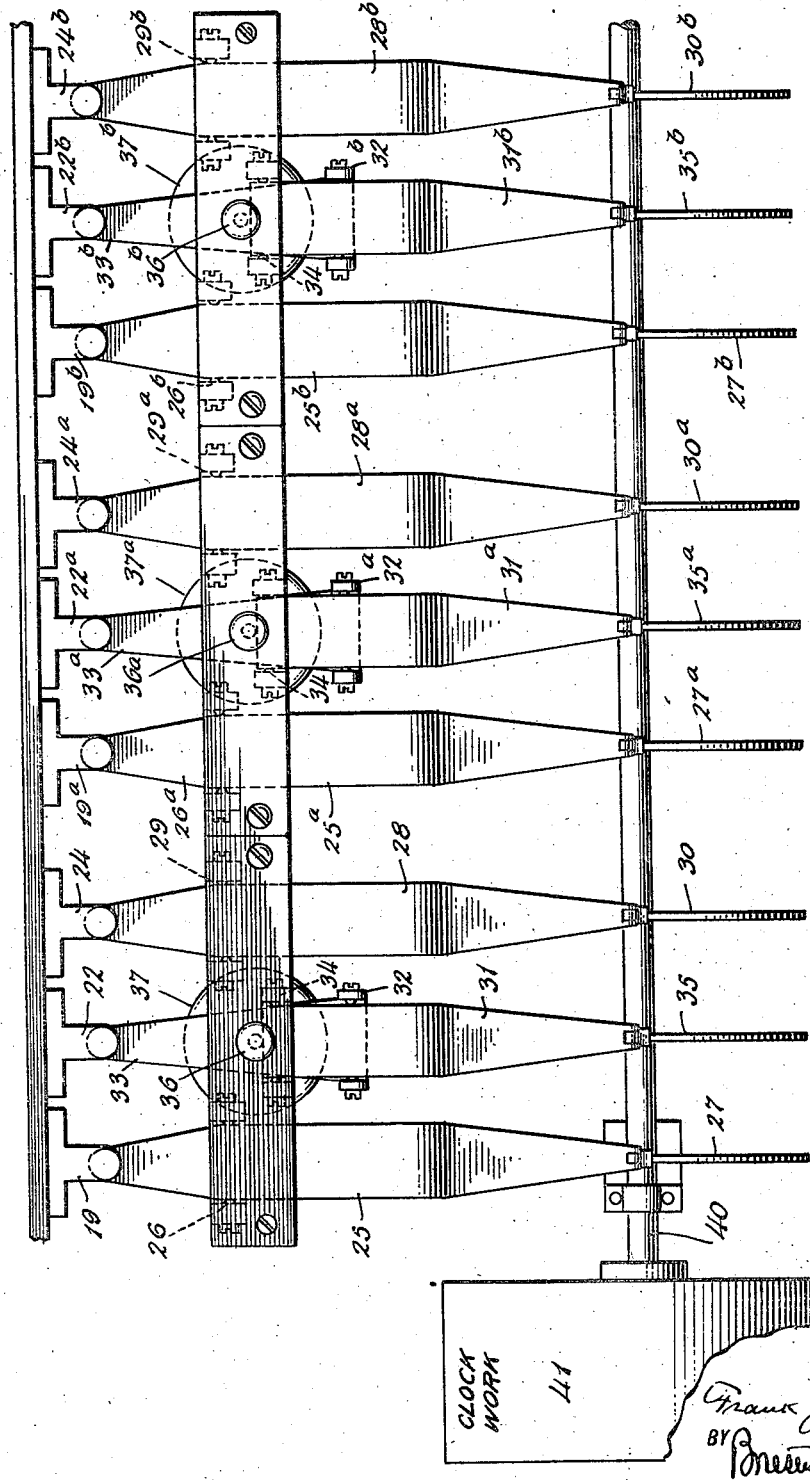

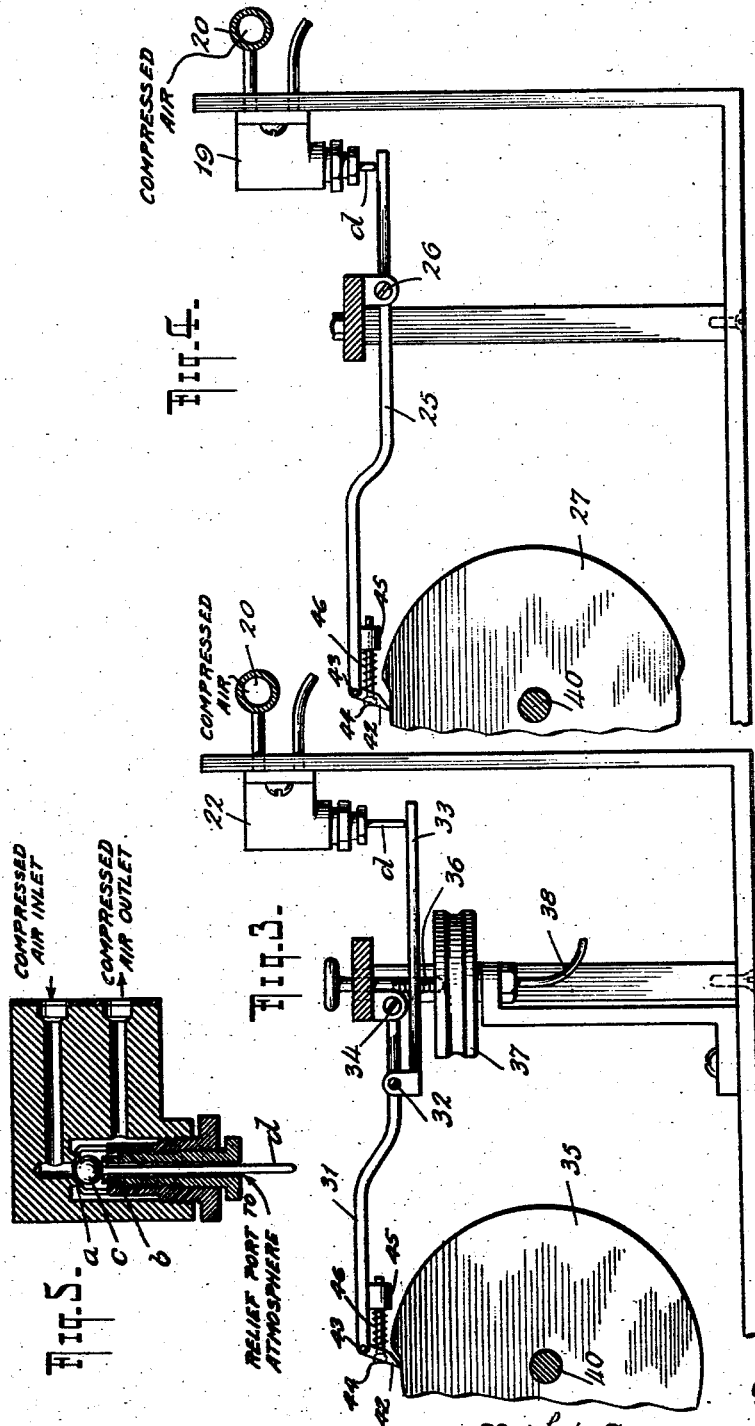

1,621,620

UNITED STATES PATENT OFFICE.

FRANK J. BAST, OF NEW YORK, N. Y., ASSIGNOR TO CHARLES J. TAGLIABUE MFG. CO., OF BROOKLYN, NEW YORK, A CORPORATION OF NEW YORK.

CONTROLLING APPARATUS.

Application filed March 1, 1924. Serial No. 696,405.

My invention relates to controlling apparatus and has for its object to provide an apparatus whereby successive operations are caused to be automatically repeated in a plurality of duplicate cycles, with the successive steps in each cycle in predetermined non-synchronized relation to the cyclic steps in the other cycles to produce a continuous result at a given point. The invention more particularly contemplates a novel apparatus for automatically controlling successive steps in the Pasteurization of liquids, and especially milk, in accordance with predetermined factors of time and temperature in duplicate units so as to obtain a continuous and uninterrupted flow of Pasteurized liquid, such as milk, after the apparatus has been started in operation. Other more specific objects will appear from the description hereinafter.

In the accompanying drawings, which illustrate an example of the invention without defining its limits, Fig. 1 is a diagrammatic view of an installation for Pasteurizing milk; Fig. 2 is an enlarged detail view showing the controlling mechanism; Fig. 3 is a detail side view of the time-temperature controller; Fig. 4 is a similar view of a time controller forming part of the invention, and Fig. 5 is a detail section of the controlling valve.

In the illustrated example, which shows the invention applied to milk Pasteurization for which it is especially adapted, the apparatus comprises three duplicate units in each of which duplicate cycles comprising successive steps of the Pasteurizing operation are repeated in predetermined sequence and in predetermined non-synchronized relation to the steps of the cycle in the next succeeding unit. That is to say, each cycle may consist of the three successive steps of filling, holding at the predetermined temperature, that is, Pasteurizing, and emptying, the first step in the second unit taking place at a time when the second step is in operation in the first unit and the first step in the third unit taking place when the second step is occurring in the second unit and the third step in the first unit and so on at predetermined time intervals, so that finally a continuous and uninterrupted flow of Pasteurized milk is obtained from the apparatus during a given period of operation. It will be understood that the duplicate cycles and the sequence of steps therein as well as the relation of the steps in one cycle to those of another as expressed above and the result as exemplified by the continuous flow of pasteurized milk are intended to be representative of equivalent conditions in other processes and are not to be construed as defining the limits of the invention.

As shown diagrammatically in Fig. 1 a plurality of tanks 10, 10ª and 10ᵇ are connected by means of pipes 11, 11ª and 11ᵇ with a main pipe 12 leading to a supply of milk to be Pasteurized. The pipes 11, 11ª and 11ᵇ are provided respectively with valves 13, 13ª and 13ᵇ of the well known diaphragm motor type in which the valve is opened for instance by the action of a spring and closed by fluid pressure upon the diaphragm. The tanks 10, 10ª and 10ᵇ are provided interiorly with any conventional and suitable form of heating device, such as coils, which are connected by means of pipes 14, 14ª and 14ᵇ respectively with a source of heating agent such as hot water. Diaphragm motor valves 15, 15ª, and 15ᵇ are located in said pipes 14, 14ª, and 14ᵇ for controlling the passage of the heating agent to the heating coils in said tanks. In addition outlet pipes 16, 16ª and 16ᵇ for the Pasteurized milk lead from the tanks 10, 10ª, and 10ᵇ and are controlled respectively by means of diaphragm motor valves 17, 17ª, and 17ᵇ.

The diaphragm chambers of the valves 13, 13ª and 13ᵇ are connected by means of pipes 18 with controlling valves 19, 19ª and 19ᵇ respectively, the latter being connected with a source of pressure such as compressed air, by means of a pipe 20; similarly the diaphragm chambers of the valves 15, 15ª and 15ᵇ are connected by pipes 21 with controlling valves 22, 22ª and 22ᵇ which are also in communication with the source of pressure for instance through the medium of the pipe 20; likewise the diaphragm chambers of the valves 17, 17ª and 17ᵇ are connected by pipes 23 with the controlling valves 24, 24ª and 24ᵇ respectively, the latter being also connected with a source of pressure, for instance by the pipe 20.

The controlling valves referred to are all of the same construction and may be of any well known type as shown for instance in detail in Fig. 5. In the illustrated example, the controlling valves are shown as of the reverse acting type, it being obvious that said valves may be of the direct acting or any other type. As shown, said valves comprise a casing in which two seats a and b are located, and both of which cooperate with a ball-valve c to lead the pressure medium, such as compressed air, either to the diaphragm chambers of the diaphragm valves or to the atmosphere in order to relieve the pressure on the valve diaphragms and thereby permit the valve springs to open said valves. Each controlling valve is provided with a stem d which projects exteriorly of the valve casing.

The stems d of the controlling valves 19, 19ª and 19ᵇ are located in cooperative relation to one end of levers 25, 25ª and 25ᵇ respectively, said levers being pivoted at 26 upon a suitable portion of the apparatus as shown in Fig. 4; the other ends of said levers are arranged to engage cams 27, 27ª and 27ᵇ which are duplicates of each other but have their active peripheral faces located in predetermined relation to each other for the purpose to be more fully set forth hereinafter. The stems d of the controlling valves 24, 24ª and 24ᵇ are likewise arranged in cooperative relation with one end of similar levers 28, 28ª and 28ᵇ pivoted at 29 upon a suitable portion of the apparatus; at their other ends the last named levers are adapted to engage cams 30, 30ª and 30ᵇ which are duplicates of each other but have their active peripheral faces also located in predetermined relation to each other and to the cams 27, 27ª and 27ᵇ. On the other hand the stems d of the controlling valves 22, 22ª and 22ᵇ are adapted to cooperate with one end of auxiliary members 33, 33ª and 33ᵇ, which members are pivotally connected at 32, with main members 31, 31ª and 31ᵇ respectively as shown in detail in Fig. 3. The aforesaid auxiliary and main members together constitute compound levers, pivoted at 34 upon suitable portions of the apparatus and cooperating with suitable cams 35, 35ª and 35ᵇ. The auxiliary members 33, 33ª and 33ᵇ carry adjustable abutments preferably in the form of screws 36 which have no direct connection with the main members 31, 31ª and 31ᵇ and as shown in Fig. 3 extend loosely through that part of the apparatus on which the compound levers are fulcrumed. The screws 36 are arranged to cooperate with thermo-sensitive devices such as capsular springs 37, 37ª and 37ᵇ, there being one of these capsular springs for each compound lever 31—33, 31ª—33ª, and 31ᵇ—33ᵇ, as shown diagrammatically in Fig. 1. The capsular springs or other thermo-sensitive devices in turn are connected by means of capillary tubes 38 with thermostatic bulbs or the like 39, 39ª and 39ᵇ projecting respectively into the tanks 10, 10ª and 10ᵇ so as to be influenced, in the present case, by the temperature of the milk being Pasteurized therein.

All of the cams previously mentioned herein are operated coincidentally in a certain predetermined relation to each other to perform their functions at the proper times and throughout given periods of time. For this purpose said cams are all fixed upon a spindle 40 which is driven by a suitable clockwork 41 arranged to rotate said cams in suitable predetermined time periods. The clockwork 41, which is common to all of the cams hereinbefore mentioned, and said cams themselves are intended to exemplify a time-controlled actuating mechanism whereby the predetermined control is effected.

In the system for Pasteurizing milk illustrated in the drawings the milk to be Pasteurized may be preheated to a predetermined degree prior to its being introduced into the tanks of the controlling apparatus; the preheating may be done in any convenient manner, as for instance in a preheating tank into which the milk is run from a holding tank, the temperature of said preheating tank being suitably regulated automatically by means of a separate regulator.

When the apparatus is to be put into operation, it is set in such a manner that the starting end of the cam 27 is brought beneath the lever 25 which, as a result is rocked upon its pivot in a manner to cause the stem d of the controlling valve 19 to shift its ball-valve c in such a way as to permit the compressed air in the diaphragm chamber of the valve 13 to escape to the atmosphere. The air pressure on the diaphragm in said chamber thus being relieved, the valve 13 will be opened by the action of its spring and milk will flow into the tank 10. At the same time, the cam 35 operates the compound lever 31—33 in a manner to cause the controlling valve 22 to relieve the air pressure on the diaphragm of the valve 15; the latter is accordingly opened by the action of its spring and thereby permits hot water or other heating agent to enter the heating coil in the tank 10, thus commencing the heating which terminates in the Pasteurizing temperature. This heating is automatically controlled by the action of the bulb 39 and capsular spring 37 in such a manner as to maintain the Pasteurizing temperature, when reached, at a constant point; that is to say if the temperature in the tank 10 falls below the intended point, the spring 37 will collapse either in part or wholly. This causes an independent operation of the auxiliary member 33 of the compound lever 31—33, relatively to the main member 31, thereof, whereby the controlling valve 22 is actuated in a manner to relieve the compressed air pressure upon the diaphragm chamber of the valve 15. The latter is thus opened to an increased degree by the action of its spring to permit an increased supply of heating medium to reach the heating coil of the tank 10; as the temperature in said tank accordingly rises, the capsular spring 37 will be expanded and finally will again independently actuate the member 33 of the compound lever 31—33 in a manner to cause the controlling valve 22 to increase the air pressure upon the diaphragm of the valve 15 which accordingly is moved toward its closed position to again reduce the supply of heating medium to the heating coil in the tank 10. Similarly if said temperature rises materially beyond the intended point, the capsular spring 37 will be expanded and, by proper actuation of the compound lever 31—33 will throttle the supply of heating medium by means of the valve 15. In this way, the temperature of the latter is automatically maintained at a predetermined constant point.

The cams 27 and 35 are cut so that the controlling valves 19 and 22 are caused to maintain the valves 13 and 15 in open positions for predetermined equal periods of time, say for instance thirty minutes and at the end of said periods of time to bring about a closing of the valves 13 and 15. In the illustrated example the filling of the tank 10 with milk through the inlet valve 13 occupies thirty minutes during which the heating agent is also admitted so that at the end of said thirty minutes, when the cam 27 operates to close the valve 13 and shut off the supply of milk to the tank 10, the desired temperature at which Pasteurization takes place has been reached. That is to say when the desired quantity of milk has been introduced into the tank 10, in the present case at the end of thirty minutes, the lever 25 will drop from the high section of the cam 27 to the low section thereof. This permits the control valve 19 to operate in a manner to admit air under pressure to the diaphragm of the valve 13 whereupon the latter is closed by the action of the compressed air. The cam 35 is so cut that the heat control valve 15 will be retained in its controlling position for a further period of, for instance, thirty minutes, during which the milk in said tank 10 is subjected to the Pasteurizing temperature. During such predetermined period of Pasteurization the thermostatic bulb 39 and the capsular spring 37 will operate in the manner previously described to maintain this temperature at the intended degree. At the end of said predetermined period of Pasteurization the compound lever 31—33 will drop from the high section of the cam 35 to the low section thereof and thus permit the control valve 22 to operate in a manner to admit air under pressure to the diaphragm of the valve 15. The latter is accordingly closed by the action of said compressed air and the supply of heating medium, that is hot water, to the coil of the tank 10 is cut off.

At the same time, the lever 28 passes from the low section of the cam 30 to the high section thereof and consequently operates the control valve 24 in a manner to relieve the pressure of the compressed air on the diaphragm of the valve 17 which as a result is opened by the action of its spring and allows the Pasteurized milk to flow from the tank 10 through the outlet pipe 16 to a cooler and then to a collecting receptacle.

The described operations are repeated in consecutive continuously recurring cycles which are duplicated in each of the three units of the illustrated example of the invention. The cycles in the respective units are, however, not carried out in synchronism to the extent that the same steps in said cycles take place coincidentally in all of the cycles; on the contrary the arrangement is non-synchronous and is such that a continuous result is produced at a given point which in the present case is exemplified by a continuous supply of Pasteurized milk which is delivered at the point of collection.

With this end in view the lever 25$^a$ passes from the low section of the cam 27$^a$ to the high section thereof at the moment when the lever 25 drops from the high section of the cam 27 to the low section thereof. Thus as the supply of unpasteurized milk to the tank 10 ceases, the supply of such milk to the tank 10$^a$ begins and continues during the period of time that Pasteurization is taking place in said tank 10; it will of course be understood that, by cooperation of the cam 35$^a$, compound lever 31$^a$—33$^a$, and control valve 22$^a$ in the same manner as described with respect to the corresponding elements of the first unit, the valve 15$^a$ is opened to admit the heating medium or specifically hot water to enter the coil of the tank 10$^a$. The filling of the tank 10$^a$ likewise occupies a predetermined period of time as for instance thirty minutes, at the end of which the valve 13$^a$ is automatically closed because of the fact that the lever 25$^a$ drops from the high section of the cam 27$^a$ to the low section thereof.

At the moment when this occurs the lever 25$^b$ passes from the low section of the cam 27$^b$ to the high section thereof and consequently brings about an opening of the valve 13$^b$ whereupon milk to be Pasteurized begins to flow into the tank 10$^b$. Coincidentally with the commencement of the operation of filling the tank 10$^b$ the lever 28 drops from the high section of the cam 30 and thereby permits the control valve 24 to relieve the air pressure on the diaphragm of the outlet valve 17 which as a result is opened by the action of its spring and allows the Pasteurized milk to flow from the tank 10 to the collecting point. At this stage Pasteurization of milk is taking place in the tank 10ᵃ from which it follows that when a cycle has been completed in one tank, an intermediate point in the cycle has been reached in another tank and the first step in the cycle is being performed in the third tank. In other words when the tank 10 is being emptied, Pasteurization is taking place in the tank 10ᵃ and the tank 10ᵇ is being filled, this progression being maintained in the three units throughout any given period of operation of the apparatus and resulting in a continuous and uninterrupted flow of Pasteurized milk to the point of collection during such period. Expressed in minutes the operation may be set forth as thirty minutes for filling, thirty minutes for Pasteurizing or holding at the high Pasteurizing temperature and thirty minutes for emptying, this cycle being progressively one step in advance in the three tanks 10, 10ᵃ and 10ᵇ.

The same result and equivalent results may be obtained with any number of units by arranging the clock to rotate the cams in correspondingly suitable time periods each of which corresponds to one step of a cycle in the units, the cams, of course, being arranged accordingly with respect to each other, so as to produce the desired progression of steps in a cycle in one unit relatively to those of a cycle in another unit.

In order to avoid the necessity for minutely adjusting the position of the several cams upon the shaft 40 and to enable the desired accuracy of operation of the apparatus to be obtained in a simple manner, the cam engaging ends of the levers 25, 25ᵃ, 25ᵇ, 28, 28ᵃ, and 28ᵇ and the corresponding ends of the members 31, 31ᵃ, and 31ᵇ of the compound levers are preferably constructed so as to be adjustable to properly set said cam engaging ends upon the respective cams. As shown in Figs. 3 and 4, members 42 are pivoted at 43 upon the respective levers and are provided with apertures through which set screws 44 pass loosely, the heads of said screws bearing against said members or against annular shoulders formed therein. The set screws 44 are in screwthreaded engagement with lugs 45 depending from the levers and are surrounded by springs 46 which bear against said lugs 45 and the members 42 respectively and exert a tension tending to force the latter against the heads of the set screws 44. By screwing the latter into and out of the lugs 45, the positions of the members 42 on the lever will be varied and the operative relation of the latter to the cams correspondingly adjusted to obtain the desired operation; it will be understood that the pressure of the springs 46 causes the members 42 to follow the heads of the set screws 44 when the latter are screwed out of the lugs 45.

The apparatus is simple in construction and reliable in operation and is adapted to be efficiently utilized for automatically controlling processes in which exact duplication of time and temperature in predetermined progressive relation in a plurality of units is desired.

Various changes in the specific form shown and described may be made within the scope of the claims without departing from the spirit of the invention.

I claim:

1. The combination of a plurality of tanks, conducting means common to all of said tanks, controlling valves whereby the conducting means is independently controlled with respect to each tank, means connected with each tank for varying the temperature therein, controlling valves whereby the temperature changing means is independently controlled with respect to each tank, emptying means connected with said tanks, controlling valves whereby said emptying means is independently controlled with respect to each tank, a plurality of devices for operating said controlling valves in predetermined relation to each other to automatically produce operative cycles consisting of a filling period, a constant temperature period and an emptying period in each of said tanks in predetermined non-synchronism with respect to each other.

2. In an apparatus for Pasteurizing milk, the combination of a plurality of tanks, filling means for filling said tanks with milk, valves whereby said filling means is controlled independently with respect to each tank, conducting means for introducing a heating agent into said tanks, valves whereby said conducting means is controlled independently with respect to each tank, emptying means for conducting the Pasteurized milk from said tanks, valves whereby said emptying means is controlled independently with respect to each tank, a plurality of cams constructed and arranged to control said controlling valves in predetermined relation to each other to produce filling, Pasteurizing and emptying periods of predetermined time duration in individual tanks and in predetermined non-synchronous relation in said tanks collectively, and time-controlled mechanism common to all of said cams for simultaneously operating the same in predetermined time periods.

In testimony whereof I have hereunto set my hand.

FRANK J. BAST.